United States Patent
Suzuki et al.

(10) Patent No.: US 6,233,081 B1
(45) Date of Patent: May 15, 2001

(54) OPTICAL SCANNING DEVICE, IMAGE FORMING APPARATUS AND OPTICAL SCANNING METHOD

(75) Inventors: Seizo Suzuki; Taira Kouchiwa, both of Kanagawa; Kenichi Takanashi, Chiba, all of (JP)

(73) Assignee: Ricoh Company Ltd., Tokyo (JP)

( * ) Notice: Subject to any disclaimer, the term of this patent is extended or adjusted under 35 U.S.C. 154(b) by 0 days.

(21) Appl. No.: 09/469,955

(22) Filed: Dec. 21, 1999

(30) Foreign Application Priority Data

Dec. 24, 1998 (JP) .................................................. 10-366921

(51) Int. Cl.⁷ .................................................. G02B 26/08
(52) U.S. Cl. ........................ 359/212; 359/196; 359/205; 359/206
(58) Field of Search ..................... 359/196, 197, 359/205, 206, 207, 208, 212, 216, 217, 218, 219

(56) References Cited

U.S. PATENT DOCUMENTS

| | | |
|---|---|---|
| 4,756,584 | 7/1988 | Takanashi . |
| 4,836,630 | 6/1989 | Takanashi . |
| 4,846,539 | 7/1989 | Takahashi et al. . |
| 5,005,928 | 4/1991 | Suzuki et al. . |
| 5,033,806 * | 7/1991 | Tomita et al. ........................ 359/207 |
| 5,087,983 | 2/1992 | Takahashi et al. . |
| 5,161,047 | 11/1992 | Tomita et al. . |
| 5,355,244 | 10/1994 | Suzuki et al. . |
| 5,459,601 | 10/1995 | Suzuki et al. . |
| 5,546,216 | 8/1996 | Suzuki . |
| 5,717,511 | 2/1998 | Suzuki . |
| 5,757,532 | 5/1998 | Takanashi . |
| 5,771,115 | 6/1998 | Takanashi . |
| 5,875,051 | 2/1999 | Suzuki et al. . |
| 5,986,791 * | 11/1999 | Suzuki et al. ........................ 359/207 |
| 6,069,724 * | 5/2000 | Hayashi et al. ........................ 359/206 |
| 6,081,386 * | 6/2000 | Hayashi et al. ........................ 359/641 |
| 6,104,522 * | 8/2000 | Hayashi et al. ........................ 359/196 |

FOREIGN PATENT DOCUMENTS 2757308   3/1998   (JP) .

* cited by examiner

Primary Examiner—Darren Schuberg
(74) Attorney, Agent, or Firm—Greenberg Traurig LLP

(57) ABSTRACT

An optical scanning device includes a light source, a coupling lens, an optical deflector, an aperture and a scanning image-forming optical system. The central wavelength of the light flux emitted by the light source is less than about 680 nm, and NAO, $\kappa$, $\beta_0$ satisfy $\beta_0/(NAO \cdot \kappa) < 100$, and NAO satisfies $0.18 < NAO < 0.35$, where: NAO represents the light-source-side numerical aperture of the coupling lens; $\kappa$ represents the ratio A/D of the larger diameter A of the diameters, in a main scanning direction and a sub-scanning direction, of the opening of the aperture relative to the diameter D of the light flux emitted from the coupling lens; and $\beta_0$ represents the larger one of the lateral magnifications, in the main scanning direction and the sub-scanning direction, of the entire optical system with respect to an optical path extending from the light source to the surface to be scanned, and including a point of the image surface, at which point the image height is 0.

80 Claims, 4 Drawing Sheets

IMAGE - SURFACE CURVATURE

UNIFORM - VELOCITY CHARACTERISTICS

MAIN SCANNING DIRECTION

SUB - SCANNING DIRECTION

LIGHT INTENSITY DISTRIBUTION BEFORE BEING INCIDENT ON APERTURE

LIGHT INTENSITY DISTRIBUTION AFTER EMITTING FROM APERTURE (SCANNING OPTICAL SYSTEM)

LIGHT INTENSITY DISTRIBUTION OF BEAM SPOT ON IMAGE SURFACE

OPTICAL SCANNING DEVICE, IMAGE FORMING APPARATUS AND OPTICAL SCANNING METHOD

BACKGROUND OF THE INVENTION

1. Field of the Invention

The present invention relates to an optical scanning device, an image forming apparatus including the optical scanning device and an optical scanning method.

2. Description of the Related Art

An optical scanning device has been widely used in a laser printer, a facsimile machine, a digital copier and other such image forming apparatuses. Recently, image forming density has been increased, and high-density image forming in which the image density exceeds 1200 dpi is being used.

In order to achieve such high-density image formation, it is necessary to sufficiently reduce a diameter of a beam spot which scans a surface to be scanned. In order to obtain a small-diameter beam spot, it is necessary to reduce the wavelength of the light emitted by a light source, and, also, to increase the NA of an optical system.

Further, in order to cause the diameter of the beam spot to be stable and uniform size, it is necessary to achieve the optical system in which the allowable degree for depth of focus is high, which system tolerates possible 'component allowance (the curvature radiuses, thickness, refractive indexes) deviations' of optical elements, mounting errors, and environment variation such as variation in temperature/humidity. For this purpose, it is necessary to optimize not only the optical system on and after the optical deflector but also the optical system on the light-source side of the optical deflector.

SUMMARY OF THE INVENTION

Preferred embodiments of the present invention provide an optical scanning device that achieves a desired small-diameter beam spot, and produces a stable and uniform diameter of the beam spot despite component allowance deviations of optical elements, mounting errors, and environment variations, in an optical scanning device.

An optical scanning device according to a preferred embodiment of the present invention includes a light source, a coupling lens, an optical deflector, an aperture and a scanning image-forming optical system.

The light source to be used is one which emits a light flux, the central wavelength of which is smaller than about 680 nm.

The coupling lens couples the divergent light flux emitted by the light source to form a parallel light flux, a weakly convergent light flux or a weakly divergent light flux.

The optical deflector has a deflection reflective surface, and deflects the light flux from the coupling lens at a uniform angular velocity. As the optical deflector, a polygon mirror, a rotary two-surface mirror, a rotary single-surface mirror or the like may be used.

The aperture is provided between the light source and optical deflector, and is arranged to cut off a peripheral portion of the light flux so as to control a beam spot diameter formed on a surface to be scanned.

The scanning image-forming optical system converges the light flux deflected by the optical deflector to a beam spot on the surface to be scanned so as to scan the surface to be scanned at a uniform velocity.

NAO, κ, $β_0$, satisfy the following condition:

$$β_0/(NAO·κ)<100, \qquad (1)$$

where:
 NAO represents the light-source-side numerical aperture of the coupling lens;
 κ represents the ratio A/D of the larger one A of the diameters, in a main scanning direction and a sub-scanning direction, of the opening of the aperture, relative to the diameter D of the light flux emitted from the coupling lens; and
 $β_0$ represents the larger one of the lateral magnifications, in a main scanning direction and a sub-scanning direction, of the entire optical system with respect to an optical path extending from the light source to the surface to be scanned, which optical path reaches a point of the image surface, at which point the image height is 0.

Further, NAO satisfies the following condition:

$$0.18<NAO<0.35. \qquad (2)$$

In an optical scanning device according to another preferred embodiment of the present invention,
 NAO, κ, $β_0$ satisfy the following condition:

$$β_0/(NAO·κ)<100, \qquad (1)$$

and, also, $β_0$ satisfies the following condition:

$$β_0<30. \qquad (3)$$

In an optical scanning device according to another preferred embodiment of the present invention,
 NAO, κ, $β_0$ satisfy the following condition:

$$β_0/(NAO·κ)<100, \qquad (1)$$

and, also, r. satisfies the following condition:

$$0.2<κ<0.6. \qquad (4)$$

It is possible that the above-mentioned conditions (1), (2) and (3) are satisfied.

Further, it is possible that the above-mentioned conditions (1), (2) and (4) or (1), (3) and (4) are satisfied.

Further, it is possible that, in any of the above-mentioned arrangements, a line-image image-forming optical system having positive power only in the sub-scanning cross section is provided on an optical path extending between the light source and the optical deflector, and the aperture is placed on an optical path extending between the coupling lens and the line-image image-forming optical system.

As the line-image image-forming optical system, a positive cylinder lens or a concave cylinder mirror may be used.

It is possible that the scanning image-forming optical system includes image-forming lenses or an image-forming lens. However, it is not necessary to be limited to this. Alternatively, it is possible that the scanning image-forming system includes an image-forming mirror, or a combination of an image-forming mirror and an image-forming lens.

Assuming that the beam spot diameter co on the image surface (coincident with the surface to be scanned, ideally) in the optical scanning device is '$1/e^2$ diameter' in a light intensity distribution, the beam spot diameter ω is expressed approximately as follows:

$$ω=0.82·λ/NA≈(0.82·λ·β_0)/(NAO·κ) \qquad (5)$$

where:

λ: the central wavelength of the light emitted by the light source;

NA: the numerical aperture, on the emitting side (the scanned-surface side), of the coupling lens;

NAO: the numerical aperture, on the light-source-side, of the coupling lens;

κ: the ratio A/D of the larger one A of the diameters, in the main scanning direction and the sub-scanning direction, of the opening of the aperture, to the diameter D of the light flux emitted from the coupling lens;

$\beta_0$: the larger lateral magnification of magnifications in the main scanning direction and sub-scanning direction, of the entire optical system with respect to an optical path extending from the light source to the surface to be scanned, which optical path reaches a point of the image surface, at which point the image height is 0.

In order to obtain a small-diameter beam spot which satisfies high-density writing exceeding 1600 dpi, it is necessary to shorten the wavelength λ to less than about 680 nm, and, also, optimize the magnification of the optical system, the numerical aperture of the coupling lens and the ratio of beam-spot-diameter controlled by the aperture, it is possible to obtain an advantageous optical system for obtaining a small-diameter beam spot. That is, when $\beta_0/(NAO \cdot \kappa)=100$, (the maximum value) in the condition (1), the beam spot diameter ω on the image surface is 55.76 $\mu$m by using the above-mentioned equation (5). Therefore, it can be said that, by satisfy the condition (1), it is possible to achieve a beam spot diameter smaller than about 55.76 $\mu$m. When the parameter in the condition (1) exceeds the maximum value 100 (that is, when $\beta_0/(NAO \cdot \kappa)>100$), it becomes difficult to obtain a small-diameter beam spot which is necessary for high-density image formation.

It is preferable that the numerical aperture NAO, on the incident side of the coupling lens satisfies the condition (2). When the NAO exceeds the maximum value about 0.35, it is likely that the wavefront aberration of the coupling lens is degraded, and, thereby achievement of a small-diameter beam spot is prevented. On the other hand, when the NAO is smaller than about 0.18, it is not possible to efficiently draw the light flux from the light source, the light transmission efficiency is degraded, and it is not possible to cope with high-speed optical scanning.

Further, it is preferable that $\beta_0$ satisfies the condition (3). When the distance between the light source and the coupling lens changes by Δt due to environmental variations or the like, the image-forming position of the beam spot moves far in accordance with the longitudinal magnification $\beta_0^2$. Therefore, when $\beta_0$ exceeds the maximum value 30 of the condition (3), $\beta_0^2 \Delta t$ becomes larger than 900Δt, a large defocusing occurs on the image surface and achievement of a small-diameter beam spot is obstructed.

When a semiconductor laser is used as the light source, the light intensity distribution of the light flux emitted by the semiconductor laser is approximately in accordance with 'the Gaussian distribution'. Further, the divergence angles of the light flux are different from one another in directions that are substantially perpendicular to the direction that is parallel to the junction plane of the semiconductor, and the far field pattern of the light flux has a substantially elliptic shape.

When the semiconductor laser which emits a light flux having the Gaussian distribution is used as the light source, the intensity distribution of the beam spot on the surface to be scanned (a surface of a photosensitive body, concretely) is approximately the Gaussian distribution.

The allowable degree for depth of focus (the allowable degree for the beam spot diameter relative to defocusing) of the intensity distribution in accordance with the Gaussian distribution becomes smaller in proportion to the square of the beam spot diameter as expressed by the following equation:

$$2d \approx \omega^2/\lambda \qquad (6)$$

where:

2d: width of the allowable degree for depth of focus;

ω: beam spot diameter; and

λ: wavelength of the light flux.

As shown in FIG. 4A, when the light flux before being incident on the aperture has a light intensity approximately in accordance with the Gaussian distribution, as a result of a lower slope (peripheral portion) of the light flux being cut off (apodization being enlarged) by the coupling lens 1 and aperture 2, as shown in FIG. 4B, the light flux emitted from the aperture approaches to have a 'rectangular intensity distribution'. The Fraunhofer image on the image surface of the light flux having the substantially rectangular intensity distribution is not in accordance with the Gaussian distribution, but is a beam spot image in which the energy density at the center thereof is high. Accordingly, as shown in the lower figure of FIG. 4C, as the apodization is enlarged and A/D is reduced, the intensity distribution of the beam spot on the image surface is such that the width thereof is shortened.

Thus, the intensity distribution in the case where apodization is large has a 'pan-bottom-shaped depth curve', and allowance against defocusing is large. Therefore, it is possible to obtain a satisfactory beam spot diameter even when component allowance (the curvature radiuses, thickness, refractive indexes) deviations of optical elements, mounting errors, and/or environment variations occur.

In the condition (4), if the value of κ exceeds the maximum value 0.6, 'the effect of apodization' is not sufficient, and it is difficult to obtain an optical system having a high allowable degree for depth of focus. If the value of κ is smaller than the minimum value 0.2, the light quantity loss in the aperture is large, and it is difficult to achieve a scanning optical system suitable for high-speed image formation.

Thus, according to preferred embodiments of the present invention, it is possible to achieve a novel optical scanning device. The optical scanning device according to preferred embodiments of the present invention can form a small-diameter beam spot suitable for high-speed writing, and, also, can form a beam spot having a good depth characteristic and not likely to be adversely affected by environmental variations and/or component allowance deviations of optical components.

Other objects, elements, features and advantages of the present invention will become more apparent from the following detailed description when read in conjunction with the accompanying drawings.

DETAILED DESCRIPTION OF PREFERRED EMBODIMENTS

The line of the ray deflected by an optical deflector, which ray is substantially perpendicular to a surface to be scanned, is referred to as an optical axis of an optical system provided after an optical deflector.

The line of the ray emitted by a light source, which ray (chief ray) has the highest intensity, is referred to as an optical axis of an optical system provided before the optical deflector.

A cross section taken along a plane including the plane formed as a result of the chief ray being deflected by the optical deflector is referred to as the main scanning cross section.

The direction parallel to the line formed as a result of the plane including the plane formed as a result of the chief ray being deflected by the optical deflector crossing the surface to be scanned is referred to as the main scanning direction.

A cross section taken along either a plane including the optical axis of the optical system provided before the optical deflector or a plane including the optical axis of the optical system provided after the optical deflector, each plane being substantially perpendicular to the plane formed as a result of the chief ray being deflected by the optical deflector is referred to as the sub-scanning direction.

The direction that is substantially parallel to the line formed as a result of the plane including the optical axis of the optical system provided after the optical deflector and substantially perpendicular to the plane formed as a result of the chief ray being deflected by the optical deflector crossing the surface to be scanned is referred to as the sub-scanning direction.

The point at which the chief ray which is coincident with, immediately after being deflected by the optical deflector, the optical axis of the optical system provided after the optical deflector reaches the surface to be scanned is referred to as 'the point of the image surface, at which point the image height is 0'.

The direction which is, for the optical system provided after the optical deflector, the same as the main scanning direction, and, for the optical system provided before the optical deflector, is substantially perpendicular to the plane including the optical axis of the optical system provided before the optical deflector and substantially perpendicular to the plane formed as a result of the chief ray being deflected by the optical deflector is referred to as the main scanning direction.

Figure 1:
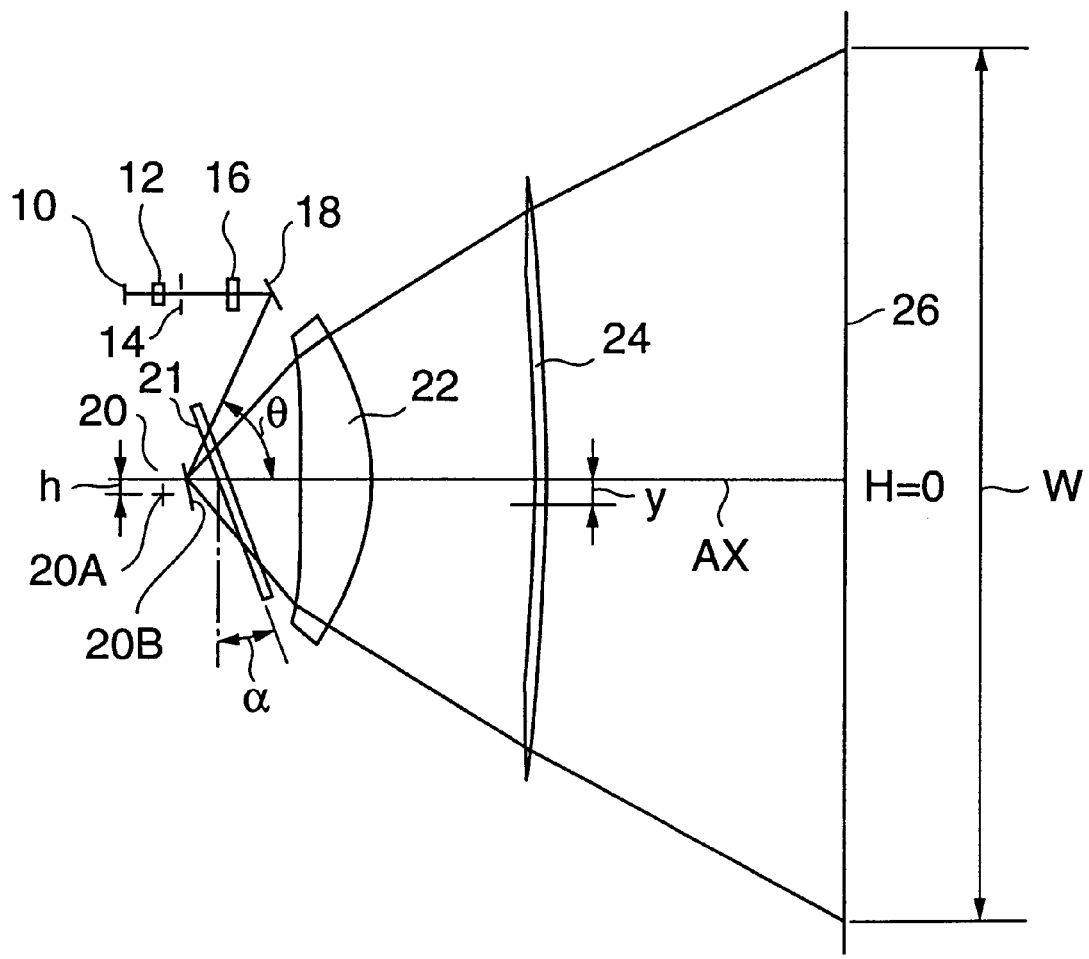
FIG. 1 shows an optical scanning device according to one preferred embodiment of the present invention.

FIG. 1 shows a preferred embodiment of an optical scanning device according to the present invention.

In FIG. 1, the light source 10 is preferably a 'semiconductor laser, and the central waveform ($\lambda$) of the light emitted by the light source 10 is preferably shorter than about 680 nm. The light flux emitted from the light source 10 is incident on a coupling lens 12. Then, the light flux from the light source 10 is coupled by the coupling lens 12 to form a parallel light flux, a weakly convergent light flux or a weakly divergent light flux. Thus, the divergence of the light flux is reduced by the coupling lens. Thus, the form of the light flux is transformed into the form suitable for the following optical system. Then, an aperture 14 cuts off a peripheral portion of the light flux so as to control the diameter of the beam spot formed on the surface to be scanned 26. Then, the light flux is converged in the sub-scanning cross section by a cylindrical lens 16 which defines a line-image image-forming optical system. After being converged, the light flux is incident on a mirror 18. By the mirror 18, the optical path of the light flux is bent. Then, the light flux forms a line image elongated in the main scanning direction in proximity to a deflection reflective surface 20B of the optical deflector 20. Then, the light flux is deflected at a uniform angular velocity as the optical deflector 20 rotates.

The deflected light flux is converged to form a beam spot on the surface to be scanned 26 due to the function of lenses 22 and 24 which define the 'scanning image-forming optical system' and scans the surface to be scanned 26 at a uniform velocity.

This optical scanning device includes a soundproof glass 21 provided in a housing of the optical deflector 20. The light flux from the light-source side is transmitted by the soundproof glass 21, and is incident on the deflection reflective surface 20B of the optical deflector 20. Then, the deflected light flux is incident on the scanning image-forming lenses 22 and 24 via the soundproof glass 21.

Thus, this preferred embodiment of the optical scanning device shown in FIG. 1 includes the light source 10, the coupling lens 12 which couples the light flux from the light source 10 so as to form the light flux suitable for the following optical system, the optical deflector 20 which has the deflection reflective surface 20B and deflects the light flux from the coupling-lens side at a uniform angular velocity, the aperture 14 which is provided between the light source 10 and optical deflector 20 and cuts off a peripheral portion of the light flux so as to control the diameter of the beam spot formed on the surface to be scanned 26, and the scanning image-forming optical system 22 and 24 which converges the beam deflected by the optical deflector 20 so as to cause the deflected light flux to form the beam spot on the surface to be scanned 26, and causes scanning performed by the beam spot to be performed at a uniform velocity. The central wavelength ($\lambda$) of the light emitted by the light source 10 is shorter than about 680 nm. Further, the numerical aperture NAO, on the light-source side, of the coupling lens 12, the ratio $\kappa$ of the larger one A of the diameters, in the main scanning direction and the sub-scanning direction, of the opening of the aperture 14, to the diameter D of the light flux emitted from the coupling lens 12, and the larger lateral magnification $\beta_0$ of those, in the main scanning direction and sub-scanning direction, of the entire optical system with respect to an optical path from the light source 10 to the surface to be scanned 26, which optical path reaches a point of the image surface, at which point the image height is 0, are set so as to satisfy the following condition:

$$\beta_0/(NAO \cdot \kappa) < 100 \tag{1}$$

Further, at least one of NAO, $\kappa$ and $\beta_0$ is set to satisfy a corresponding one of the following conditions:

(2) $0.18 < NAO < 0.35$
(3) $\beta_0 < 30$
(4) $0.2 < \kappa < 0.6$

The numerical aperture NAO of the coupling lens 12 on the light-source side is expressed as follows:

$$NAO = \sin\{(w/2)/fc\}$$

where 'w' represents the diameter of the effective area of the coupling lens 12, and 'fc' represents the focal length of the coupling lens 12.

Further, the line-image image-forming optical system 16 having positive power only in the sub-scanning cross section is provided on the optical path between the light source 10 and optical deflector 20. The aperture 14 is provided on the optical path between the coupling lens 12 and the line-image image-forming optical system 16. The scanning image-forming optical system including the lenses 22 and 24 which define an image-forming lens.

The scanning optical device shown in FIG. 1 will now be described in detail.

Data of the components provided from the light source to the optical deflector is as follows:

Light Source 10:

A semiconductor laser which emits light, and the central wavelength of which light: $\lambda=650$ (nm)

Coupling Lens 12:

numerical aperture on the light-source side: NAO=0.25 focal length: fc=22 (mm)

coupling function: collimating function

Aperture 14:

diameter of the opening in the main scanning direction: 5.0 mm diameter of the opening in the sub-scanning direction: 2.4 mm The coupling lens 12 couples the light flux to form a parallel flux. The diameter, in the main scanning direction, of this parallel flux D (=NAO×fc×2=0.25×22×2) is about 11 mm. The larger diameter A of the diameters, in the main scanning direction and the sub-scanning direction, of the opening of the aperture 14 is about 5.0 mm. Therefore, $\kappa$=A/D=5.0/11=0.45.

Cylinder Lens 16:

surface on the light-source side: convex cylindrical surface surface on the optical-deflector side: plane surface focal length: fcy=93.3 (mm)

The cylinder lens 16 is arranged at such a position that the position of the focal point on the image side is positioned in proximity to the deflection reflective surface 20B of the optical deflector 20.

Soundproof Glass 21: transparent parallel plane plate refractive index: 1.51433 thickness: 2.01 mm

The soundproof glass 21 is arranged in a condition in which, as shown in FIG. 1, the soundproof glass 21 is inclined at an inclination angle $\alpha$ relative to a plane that is substantially perpendicular to the optical axis AX of the scanning image-forming optical system.

Optical Deflector 20: polygon mirror number of deflection reflective surfaces: 5 radius of the inscribed circle: 13 mm difference amount (distance h, in FIG. 1) between the rotation axis 20A and the above-mentioned optical axis AX: 7.53 mm incident angle (angle $\theta$, in FIG. 1) at which the light flux from the light-source side is incident on the polygon mirror: 60 degrees angle of view: −39.97 degrees through +39.97 degrees The scanning image-forming lenses arranged to follow the optical deflector are the lenses 22 and 24 as shown in FIG. 1.

Each of the surfaces of the lens 22 disposed on the optical-deflector side is a 'coaxial aspherical surface'.

The coaxial aspherical surface is expressed by the depth difference X between the optical axis (H=0) and the lens height H, using the following equation (7):

$$X = (H^2/R) / \left\{ 1 + \sqrt{1 - (1+K)(H/R)^2} \right\} + \quad (7)$$
$$A_4 \cdot H^4 + A_6 \cdot H^6 + A_8 \cdot H^8 + \cdots$$

where K represents a 'cone constant', R represents a 'paraxial curvature radius', $A_4, A_6, A_8, \ldots$ represent 'high order coefficients'.

The first surface (the surface on the optical-deflector side) of the lens 24 disposed on the scanned-surface side is an anamorphic lens surface having a non-circular-arc shape in the main scanning cross section, and, also, in each of cross sections taken along planes that are substantially perpendicular to the main scanning direction. The non-circular-arc shape in the cross section taken along a plane that is substantially perpendicular to the main scanning direction appropriately changes in accordance with the position of the cross section in the main scanning direction. Further, the change of the curvature radius in the cross section taken along a plane that is substantially perpendicular to the main scanning direction is asymmetrical in the main scanning direction. The second surface (the surface on the scanned-surface side) is an anamorphic lens surface having a circular-arc shape in the main scanning cross section, and, also, in each of cross sections taken along planes that are substantially perpendicular to the main scanning direction. The curvature radius in the cross section taken along a plane that is substantially perpendicular to the main scanning direction changes in the main scanning direction.

The anamorphic lens surface having the non-circular-arc shape in the main scanning cross section, and, also, in each of cross sections taken along planes that are substantially perpendicular to the main scanning direction of the above-mentioned first surface is expressed by the depth X using the following polynomial (8):

$$X = (Y^2/Rm) / \left\{ 1 + \sqrt{1 - (1+Km)(Y/Rm)^2} \right\} + \quad (8)$$
$$A_1 \cdot Y + A_2 \cdot Y^2 + A_3 \cdot Y^3 + A_4 \cdot Y^4 + A_5 \cdot Y^5 + \cdots +$$
$$(Z^2 \cdot Cs) / \left\{ 1 + \sqrt{1 - (1+Ks)(Z \cdot Cs)^2} \right\} +$$
$$(F_0 + F_1 \cdot Y + F_2 \cdot Y^2 + F_3 \cdot Y^3 + F_4 \cdot Y^4 + \cdots) \cdot Z +$$
$$(G_0 + G_1 \cdot Y + G_2 \cdot Y^2 + G_3 \cdot Y^3 + G_4 \cdot Y^4 + \cdots) \cdot Z^2 +$$
$$(H_0 + H_1 \cdot Y + H_2 \cdot Y^2 + H_3 \cdot Y^3 + H_4 \cdot Y^4 + \cdots) \cdot Z^3 +$$
$$(I_0 + I_1 \cdot Y + I_2 \cdot Y^2 + I_3 \cdot Y^3 + I_4 \cdot Y^4 + \cdots) \cdot Z^4 +$$
$$(J_0 + J_1 \cdot Y + J_2 \cdot Y^2 + J_3 \cdot Y^3 + J_4 \cdot Y^4 + \cdots) \cdot Z^5 + \cdots$$

where X axis is coincident with the optical axis, Y axis extends in the main scanning direction, in the main scanning direction, Y axis and the optical axis intersect, and Y=0 at the point at which Y axis and the optical axis intersect, Rm represents a paraxial curvature radius in the X-Y plane, Km represents a cone constant, $A_1, A_2, A_3, A_4, A_5, \ldots$ represent high order coefficients, $F_1, F_2, F_3, F_4, \ldots, G_1, G_2, G_3, G_4, \ldots, H_1, H_2, H_3, H_4, \ldots, I_1, I_2, I_3, I_4, \ldots, J_1, J_2, J_3, J_4, \ldots$, and so forth represent constant coefficients, $$Cs = 1/Rs_0 + B_1 \cdot Y + B_2 \cdot Y^2 + B_3 \cdot Y^3 + B_4 \cdot Y^4 + B_5 \cdot Y^5 + \quad (9)$$

$$KS = KS_0 + C_1 \cdot Y + C_2 \cdot Y^2 + C_3 \cdot Y^3 + C_4 \cdot Y^4 + C_5 \cdot Y^5 + \quad (10)$$

In the equations (8), (9) and (10), Z represents coordinate of the sub-scanning direction, Z axis intersect at right angles and also Z axis and Y axis intersect at right angles. Cs represents the curvature in a plane parallel to the X-Z plane. $B_1, B_2, B_3, \ldots C_1, C_2, C_3, \ldots$ present constant coefficients.

These equations define one example for expressing a lens surface, and, it is also possible to use other equations for expressing the lens surface.

The data of the optical system on and after the optical deflector is as follows:

| Surface # | Rm | $Rs_0$ | x | y | α | n |
|---|---|---|---|---|---|---|
| 0 | ∞ | — | 25.44 | 0 | | 1 |
| 1 | ∞ | — | 2.01 | 0 | 8 | 1.51433 |
| 2 | ∞ | — | 25.42 | 0 | 8 | 1 |
| 3 | 312.60 | — | 31.40 | 0 | | 1.52716 |
| 4 | −82.95 | — | 78.00 | 0 | | 1 |
| 5 | −500 | −47.67 | 3.50 | −0.41 | | 1.52716 |
| 6 | −1000 | −23.32 | 141.52 | 0 | | 1 |

In this data, 'Rm' denotes a curvature radius (in mm) in the main scanning cross section, and '$Rs_0$' denotes a curvature radius (in mm) in the cross section taken along the plane that is substantially perpendicular to the main scanning direction and including the optical axis of the lens 24. However, each denotes a paraxial curvature radius in the non-circular arc shape. The surface # of the deflection reflective surface 20B of the optical deflector 20 is 0, the surface # of the optical-deflector-side surface of the soundproof glass is 1, the surface # of the scanned-surface-side surface of the soundproof glass is 2, the surface # of the surfaces of the lenses 22 and 24 are 3, 4, 5 and 6, in sequence. The surface shape of the surface, the surface # of which is 1, is a plane surface, the surface shape of the surface, the surface # of which is 2, is a plane surface, the surface shape of the surface, the surface # of which is 3, is a coaxial aspherical surface, the surface shape of the surface, the surface # of which is 4, is a coaxial aspherical surface, the surface shape of the surface, the surface of which is 5, is a non-circular arc shape in the main scanning cross section and in each of cross sections taken along planes perpendicular to the main scanning direction, the surface shape of the surface, and the surface # of which is 6, is a circular arc shape in the main scanning cross section and in each of cross sections taken along planes that are substantially perpendicular to the main scanning direction. 'x' denotes a surface interval (in mm). That is, the interval between the surface, the surface # of which is 0, and the surface, the surface # of which is 1, is 25.44 mm, the interval between the surface, the surface # of which is 1, and the surface, the surface # of which is 2, is 2.01 mm, ..., the interval between the surface (the scanned-surface-side surface of the lens 24), the surface # of which is 6, and the surface to be scanned 26 is 141.50 mm. 'y' denotes a shift amount (in mm, positive in the upward direction, in FIG. 1). As can be seen from the data, the lens 24 has been shifted 0.41 mm downward. 'α' denotes a tilt angle (in degrees) about the Z axis from a plane that is substantially perpendicular to the optical axis AX of the lenses 22 and 24. As shown in FIG. 1, each of the two surfaces of the soundproof glass 21 has been tilted at 8 degrees about the Z axis from the plane that is substantially perpendicular to the optical axis AX of the lenses 22 and 24. 'n' denotes a refractive index of a lens material (for the wavelength of 650 nm).

The coefficients of each surface are as follows:
The third surface (the optical-deflector-side surface of the lens 22: a coaxial aspherical surface (the equation (7) ) ):

| | |
|---|---|
| K | 2.6671 |
| $A_4$ | 1.7857E-7 |
| $A_6$ | −1.0867E-12 |
| $A_8$ | −3.1812E-14 |
| $A_{10}$ | 3.7403E-18 |

The fourth surface (the scanned-surface-side surface of the lens 22: a coaxial aspherical surface (the equation (7))):

| | |
|---|---|
| K | 0.0193 |
| $A_4$ | 2.5031E-7 |
| $A_6$ | 9.6058E-12 |
| $A_8$ | 4.5447E-15 |
| $A_{10}$ | −3.0343E-18 |

The fifth surface (the optical-deflector-side surface of the lens 24: a non-circular arc shape in the main scanning cross section and in each of cross sections taken along planes perpendicular to the main scanning direction (the equations (8), (9) and (10))):

| | | | |
|---|---|---|---|
| $K_m$ | −71.7319 | $B_1$ | 0 |
| $A_1$ | 0 | $B_2$ | −4.72602E-7 |
| $A_3$ | 0 | $B_3$ | −8.38263E-10 |
| $A_4$ | 4.3256E-8 | $B_4$ | 9.04894E-11 |
| $A_5$ | 0 | $B_5$ | 4.37405E-13 |
| $A_6$ | −5.9729E-13 | $B_6$ | −6.01229E-15 |
| $A_7$ | 0 | $B_7$ | −6.46929E-17 |
| $A_8$ | −1.2819E-16 | $B_8$ | 2.55750E-20 |
| $A_9$ | 0 | $B_9$ | 3.04068E-21 |
| $A_{10}$ | 5.7297E-21 | $B_{10}$ | 2.36799E-29 |
| $C_0$ | 2.5821 | $K_0$ | −3.77145E-7 |
| $C_1$ | −2.99305E-4 | $K_1$ | 4.720357E-12 |
| $C_2$ | −6.20612E-5 | $K_2$ | 2.65693E-11 |
| $C_3$ | 0 | $K_3$ | −1.69246E-15 |
| $C_3$ | 0 | $K_4$ | −1.20928E-15 |
| $I_0$ | −3.02237E-6 | $M_0$ | −1.71892E-19 |
| $I_1$ | −2.75077E-10 | $M_1$ | −8.23793E-13 |
| $I_2$ | 6.59149E-11 | $M_2$ | −5.52334E-15 |
| $I_3$ | 2.06446E-14 | $M_3$ | 1.23174E-16 |
| $I_4$ | 7.98792E-18 | $M_4$ | 2.17562E-17 |

The sixth surface (the scanned-surface-side surface of the lens 24: a circular arc shape in the main scanning cross section and in each of cross sections taken along planes perpendicular to the main scanning direction (the equations (8) and (9))):

| | | | |
|---|---|---|---|
| $K_M$ | 0 | $B_1$ | 0 |
| $A_1$ | 0 | $B_2$ | −1.15557E-4 |
| $A_3$ | 0 | $B_3$ | 0 |
| $A_4$ | 0 | $B_4$ | −7.64287E-10 |
| $A_5$ | 0 | $B_5$ | 0 |
| $A_6$ | 0 | $B_6$ | 1.29011E-12 |
| $A_7$ | 0 | $B_7$ | 0 |
| $A_8$ | 0 | $B_8$ | −8.88372E-17 |
| $A_9$ | 0 | $B_9$ | 0 |
| $A_{10}$ | 0 | $B_{10}$ | −6.79872E-21 |

In the above notation of the coefficients, the letter E and the subsequent number indicate power of 10. For example, "E-21" means "$\times 10^{-21}$" The focal length fm of the image-forming lenses 22 and 24 in the main scanning cross section, the shapes of which lenses 22 and 24 are thus determined, is preferably about 220 mm. Further, the focal length of the coupling lens fc is 22 mm, as mentioned above. Therefore, the lateral magnification in the main scanning direction $\beta_0=220/22=10$.

Summarizing the above,

Focal length of coupling lens: fc=22 (mm);

Aperture opening diameters: (one in the main scanning direction)×(one in the sub-scanning direction)=5.0 (mm)× 2.4 (mm);

Central wavelength of the light emitted by the light-source: $\lambda=650$ (nm);

$\beta_0=fm/fc=220/22=10$;

$D=NAO \times fc \ X2 = 0.25 \times 22 \times 2 = 11$ $\kappa=A/D=5.0/11=0.45$ $\beta_0/(NAO \cdot \kappa)=10/(0.25 \times 0.45)=88.9$ Therefore, the above-mentioned conditions (1), (2), (3) and (4) are satisfied.

Figure 2:
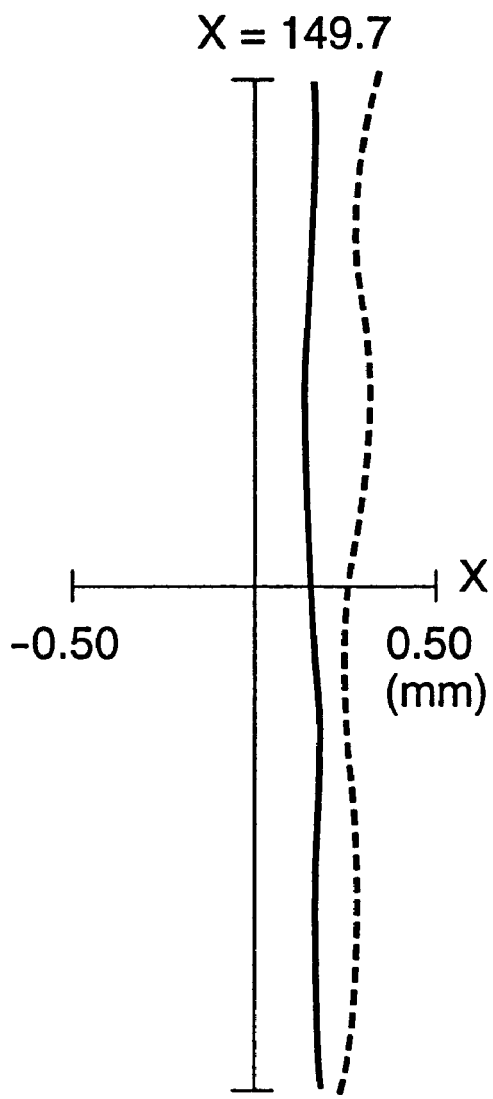
FIG. 2 shows geometrical aberrations (main scanned image-surface curvature, sub-scanned image-surface curvature, linearity and fθ characteristic) of the preferred embodiment shown in FIG. 1.
Figure 2:
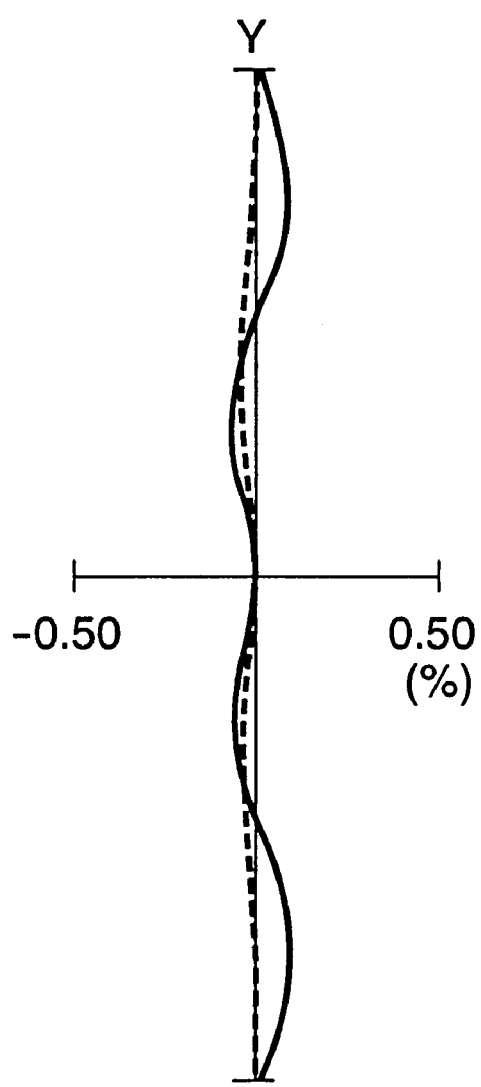

FIG. 2 shows the geometrical aberrations of the above-described preferred embodiment of the present invention. The left portion of FIG. 2 shows the image-surface curvature, and, the solid line shows the sub-scanned image-surface curvature, and the broken line shows the main scanned image-surface curvature. The right portion of FIG. 2 shows the constant-velocity characteristic, and the solid line shows the linearity, and the broken line shows the fθ characteristic.

In each of the main scanning direction and sub-scanning direction, the image-surface curvature is corrected very well, and, also, both the linearity and fθ characteristic are excellent.

Figure 3A:
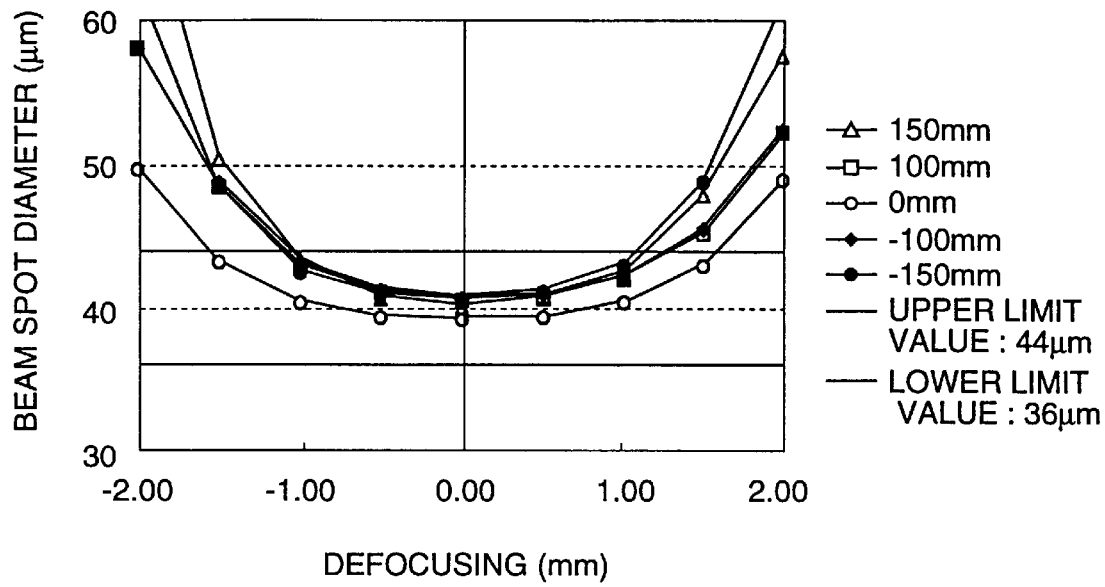
FIGS. 3A and 3B show depth curves of a beam spot diameter (variation of a beam spot diameter relative to a defocusing amount of the beam spots) at the image height of 0, ±100 mm, ±150 mm of the beam spot.
Figure 3B:
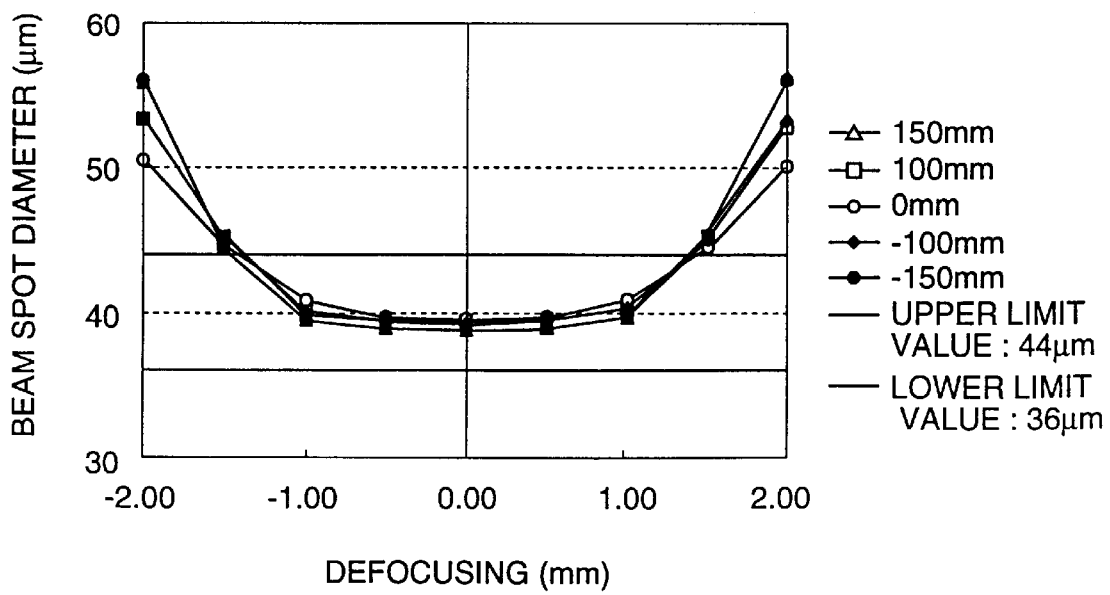
Figure 4A:
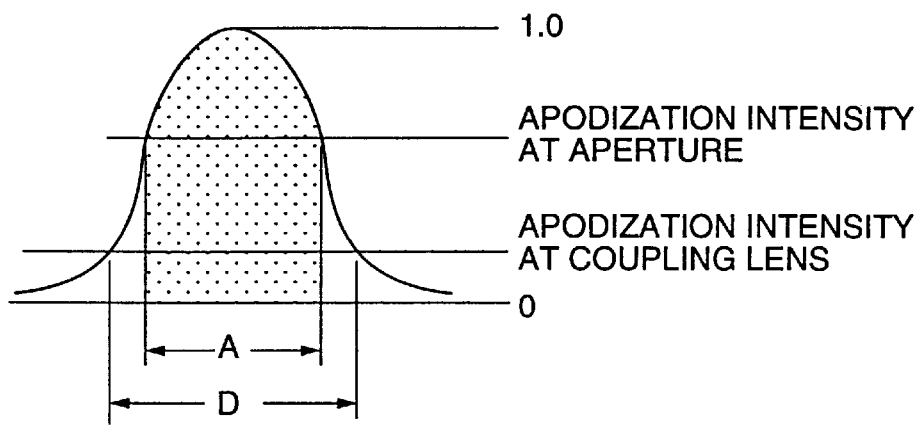
FIGS. 4A, 4B and 4C illustrate the effect of apodization in connection with condition (4).
Figure 4B:
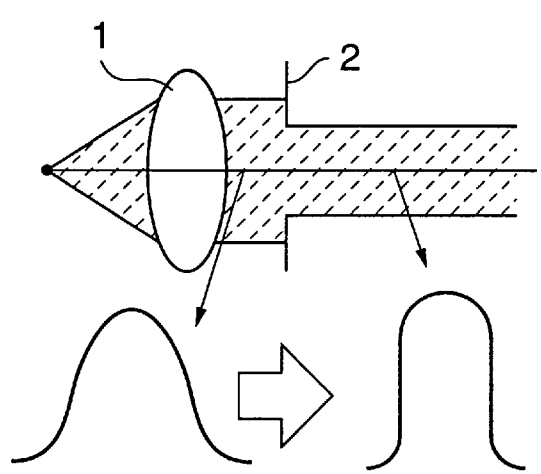
Figure 4C:
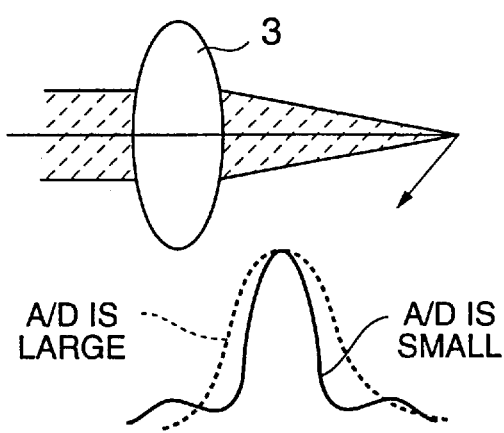

The above-described preferred embodiment has been designed to achieve a beam spot diameter of about 40±4 μm. FIGS. 3A and 3B show the depth curves at this time. As can be seen from FIGS. 3A and 3B, there is an allowable degree for depth of focus of approximately 2 mm in the main scanning direction, and, also, there is an allowable degree for depth of focus of approximately 3 mm in the sub-scanning direction. Therefore, even when considering environmental variations and optical component inaccuracies, it is possible to obtain a desired excellent beam spot diameter.

Further, the present invention is not limited to the above-described preferred embodiments and variations and modifications may be made without departing from the scope of the present invention.

The present application is based on Japanese priority application No. 10-366921, filed on Dec. 24, 1998, the entire contents of which are hereby incorporated by reference.

What is claimed is:

1. An optical scanning device, comprising:

a light source which emits a light flux;

a coupling lens which couples the light flux emitted by said light source;

a optical deflector which has a deflection reflective surface, and deflects the light flux from the coupling lens at a uniform angular velocity;

an aperture which is provided on an optical path between said light source and said optical deflector and is arranged to cut off a peripheral portion of the light flux deflected by the optical deflector to control a beam spot diameter on a surface to be scanned; and a scanning image-forming optical system converging the light flux deflected by said optical deflector to form a beam spot on said surface to be scanned so as to scan said surface to be scanned at a uniform velocity, wherein:

the central wavelength of the light flux emitted by said light source is less than about 680 nm; and NAO, $\kappa$, $\beta_0$ satisfy $$\beta_0/(NAO \cdot \kappa) < 100, \quad (1)$$

and NAO satisfies $$0.18 < NAO < 0.35, \quad (2)$$

where:

NAO represents the light-source-side numerical aperture of the coupling lens;

$\kappa$ represents the ratio A/D of the larger diameter A of the diameters, in a main scanning direction and a sub-scanning direction, of the opening of said aperture relative to the diameter D of the light flux emitted from the coupling lens; and $\beta_0$ represents the larger one of the lateral magnifications, in the main scanning direction and the sub-scanning direction, of the entire optical system with respect to an optical path extending from said light source to said surface to be scanned, which optical path reaches a point of the image surface, at which point the image height is 0.

2. An optical scanning device, comprising:

a light source which emits a light flux;

a coupling lens which couples the light flux emitted by said light source;

an optical deflector which has a deflection reflective surface, and deflects the light flux from the coupling lens at a uniform angular velocity;

an aperture which is provided on an optical path between said light source and said optical deflector and cuts off a peripheral portion of the light flux so as to control a beam spot diameter on a surface to be scanned; and a scanning image-forming optical system converging the light flux deflected by said optical deflector to form a beam spot on said surface to be scanned so as to scan said surface to be scanned at a uniform velocity, wherein:

the central wavelength of the light flux emitted by said light source is less than about 680 nm; and NAO, $\kappa$, $\beta_0$ satisfy $$\beta_0/(NAO \cdot \kappa) < 100, \quad (1)$$

and $\beta_0$ satisfies $$\beta_0 < 30, \quad (3)$$

where:

NAO represents the light-source-side numerical aperture of the coupling lens;

$\kappa$ represents the ratio A/D of the larger diameter A of the diameters, in a main scanning direction and a sub-scanning direction, of the opening of said aperture, relative to the diameter D of the light flux emitted from the coupling lens; and $\beta_0$ represents the larger one of the lateral magnifications, in the main scanning direction and the sub-scanning direction, of the entire optical system with respect to an optical path extending from said light source to said surface to be scanned, which optical path reaches a point of the image surface, at which point the image height is 0.

3. An optical scanning device, comprising:

a light source which emits a light flux;

a coupling lens which couples the light flux emitted by said light source;

an optical deflector which has a deflection reflective surface, and deflects the light flux from the coupling lens at a uniform angular velocity;

an aperture which is provided on an optical path between said light source and said optical deflector and cuts off a peripheral portion of the light flux so as to control a beam spot diameter on a surface to be scanned; and a scanning image-forming optical system converging the light flux deflected by said optical deflector to form a beam spot on said surface to be scanned so as to scan said surface to be scanned at a uniform velocity, wherein:

the central wavelength of the light flux emitted by said light source is less than about 680 nm; and NAO, κ, $\beta_0$ satisfy $$\beta_0/(NAO \cdot \kappa) < 100, \tag{1}$$

and κ satisfies $$0.2 < \kappa < 0.6, \tag{4}$$

where:

NAO represents the light-source-side numerical aperture of the coupling lens;

κ represents the ratio A/D of the larger diameter A of the diameters, in a main scanning direction and a sub-scanning corresponding direction, of the opening of said aperture, relative to the diameter D of the light flux emitted from the coupling lens; and $\beta_0$ represents the larger one of the lateral magnifications, in the main scanning direction and the sub-scanning direction, of the entire optical system with respect to an optical path extending from said light source to said surface to be scanned, which optical path reaches a point of the image surface, at which point the image height is 0.

4. The optical scanning device, as claimed in claim 1, wherein $\beta_0$ satisfies $$\beta_0 < 30. \tag{3}$$

5. The optical scanning device, as claimed in claim 1, wherein κ satisfies $$0.2 < \kappa < 0.6. \tag{4}$$

6. The optical scanning device, as claimed in claim 2, wherein κ satisfies $$0.2 < \kappa < 0.6. \tag{4}$$

7. The optical scanning device, as claimed in claim 4, wherein κ satisfies $$0.2 < \kappa < 0.6. \tag{4}$$

8. The optical scanning device, as claimed in claim 1, further comprising a line-image image-forming optical system having positive power only in the sub-scanning cross section on an optical path extending between said light source and said optical deflector, and wherein said aperture is located on an optical path extending between said coupling lens and said line-image image-forming optical system.

9. The optical scanning device, as claimed in claim 2, further comprising a line-image image-forming optical-system having positive power only in the sub-scanning cross section on an optical path extending between said light source and said optical deflector, and wherein said aperture is placed on an optical path extending between said coupling lens and said line-image image-forming optical system.

10. The optical scanning device, as claimed in claim 3, further comprising a line-image image-forming optical system having positive power only in the sub-scanning cross section on an optical path extending between said light source and said optical deflector, and wherein said aperture is placed on an optical path extending between said coupling lens and said line-image image-forming optical system.

11. The optical scanning device as claimed in claim 1, wherein said coupling lens couples the light flux emitted by said light source to form a parallel flux.

12. The optical scanning device, as claimed in claim 2, wherein said coupling lens couples the light flux emitted by said light source to form a parallel flux.

13. The optical scanning device, as claimed in claim 3, wherein said coupling lens couples the light flux emitted by said light source to form a parallel flux.

14. The optical scanning device as claimed in claim 1, wherein said scanning image-forming optical system comprises image-forming lenses.

15. The optical scanning device as claimed in claim 2, wherein said scanning image-forming optical system comprises image-forming lenses.

16. The optical scanning device as claimed in claim 3, wherein said scanning image-forming optical system comprises image-forming lenses.

17. An optical scanning device, comprising:

light emitting means for emitting a light flux;

coupling means for coupling the light flux emitted by said light emitting means;

light deflecting means having a deflection reflective surface for deflecting the light flux from the coupling means at a uniform angular velocity;

light flux shaping means provided on an optical path extending between said light emitting means and said light deflecting means for cutting off a peripheral portion of the light flux so as to control a beam spot diameter on a surface to be scanned; and scanning image-forming optical means for converging the light flux deflected by said light deflecting means to form a beam spot on said surface to be scanned so as to scan said surface to be scanned at a uniform velocity, wherein:

the central wavelength of the light flux emitted by said light emitting means is less than about 680 nm; and NAO, κ, $\beta_0$ satisfy $$\beta_0/(NAO \cdot \kappa) < 100, \tag{1}$$

and NAO satisfies $$0.18 < NAO < 0.35, \tag{2}$$

where:

NAO represents the light-emitting-means-side numerical aperture of said coupling means;

κ represents the ratio A/D of the larger one A of the diameters, in a main scanning direction and a sub-scanning direction, of the opening of said light flux shaping means, relative to the diameter D of the light flux emitted from said coupling means; and $\beta_0$ represents the larger one of the lateral magnifications, in a main scanning direction and a sub-scanning direction, of the entire optical system with respect to an optical path extending from said light emitting means to said surface to be scanned, which optical path reaches a point of the image surface, at which point the image height is 0.

18. An optical scanning device, comprising light emitting means for emitting a light flux;

coupling means for coupling the light flux emitted by said light emitting means;

light deflecting means having a deflection reflective surface for deflecting the light flux from the coupling means at a uniform angular velocity;

light flux shaping means provided on an optical path between said light emitting means and said light deflecting means for cutting off a peripheral portion of the light flux so as to control a beam spot diameter on a surface to be scanned; and scanning image-forming optical means for converging the light flux deflected by said light deflecting means to form a beam spot on said surface to be scanned so as to scan said surface to be scanned at a uniform velocity, wherein:
the central wavelength of the light flux emitted by said light emitting means is less than about 680 nm; and NAO, κ, $\beta h_0$ satisfy $$\beta_0/(NAO \cdot \kappa) < 100, \quad (1)$$

and NAO satisfies $$\beta_0 < 30 \quad (3)$$

where:
NAO represents the light-emitting-means-side numerical aperture of said coupling means;

κ represents the ratio A/D of the larger one A of the diameters, in a main scanning direction and a sub-scanning direction, of the opening of said light flux shaping means, relative to the diameter D of the light flux emitted from said coupling means; and $\beta_0$ represents the larger one of the lateral magnifications, in the main scanning direction and the sub-scanning direction, of the entire optical system with respect to an optical path extending from said light emitting means to said surface to be scanned, which optical path reaches a point of the image surface, at which point the image height is 0.

19. An optical scanning device, comprising:

light emitting means for emitting a light flux;

coupling means for coupling the light flux emitted by said light emitting means;

light deflecting means having a deflection reflective surface for deflecting the light flux from the coupling means at a uniform angular velocity;

light flux shaping means provided on an optical path between said light emitting means and said light deflecting means for cutting off a peripheral portion of the light flux so as to control a beam spot diameter on a surface to be scanned; and scanning image-forming optical means for converging the light flux deflected by said light deflecting means to form a beam spot on said surface to be scanned so as to scan said surface to be scanned at a uniform velocity, wherein:
the central wavelength of the light flux emitted by said light emitting means is less than about 680 nm; and NAO, κ, $\beta_0$ satisfy $$\beta_0/(NAO \cdot \kappa) < 100, \quad (1)$$

and NAO satisfies $$0.2 < \kappa < 0.6 \quad (4)$$

where:
NAO represents the light-emitting-means-side numerical aperture of said coupling means;

κ represents the ratio A/D of the larger one A of the diameters, in a main scanning direction and a sub-scanning direction, of the opening of said light flux shaping means, relative to the diameter D of the light flux emitted from said coupling means; and $\beta_0$ represents the larger one of the lateral magnifications, in the main scanning direction and the sub-scanning direction, of the entire optical system with respect to an optical path extending from said light emitting means to said surface to be scanned, which optical path reaches a point of the image surface, at which point the image height is 0.

20. The optical scanning device, as claimed in claim 17, wherein $\beta_0$ satisfies $$\beta_0 < 30. \quad (3)$$

21. The optical scanning device, as claimed in claim 17, wherein κ satisfies $$0.2 < \kappa < 0.6. \quad (4)$$

22. The optical scanning device, as claimed in claim 18, wherein κ satisfies $$0.2 < \kappa < 0.6. \quad (4)$$

23. The optical scanning device, as claimed in claim 20, wherein κ satisfies $$0.2 < \kappa < 0.6. \quad (4)$$

24. The optical scanning device, as claimed in claim 17, further comprising line-image image-forming optical means having positive power only in the sub-scanning cross section on an optical path extending between said light emitting means and said light deflecting means, wherein said light flux shaping means is placed on an optical path extending between said coupling means and said line-image image-forming optical means.

25. The optical scanning device, as claimed in claim 18, further comprising line-image image-forming optical means having positive power only in the sub-scanning cross section on an optical path extending between said light emitting means and said light deflecting means, wherein said light flux shaping means is placed on an optical path extending between said coupling means and said line-image image-forming optical means.

26. The optical scanning device, as claimed in claim 18, further comprising line-image image-forming optical means having positive power only in the sub-scanning cross section on an optical path extending between said light emitting means and said light deflecting means, wherein said light flux shaping means is placed on an optical path extending between said coupling means and said line-image image-forming optical means.

27. The optical scanning device as claimed in claim 17, wherein said coupling means couples the light flux emitted by said light emitting means to form a parallel flux.

28. The optical scanning device as claimed in claim 18, wherein said coupling means couples the light flux emitted by said light emitting means to form a parallel flux.

29. The optical scanning device as claimed in claim 19, wherein said coupling means couples the light flux emitted by said light emitting means to form a parallel flux.

30. The optical scanning device as claimed in claim 17, wherein said scanning image-forming optical means comprises image-forming lenses.

31. The optical scanning device as claimed in claim 18, wherein said scanning image-forming optical means comprises image-forming lenses.

32. The optical scanning device as claimed in claim 19, wherein said scanning image-forming optical means comprises image-forming lenses.

33. An image forming apparatus, comprising:
a light source which emits a light flux;
a coupling lens which couples the light flux emitted by said light source;
an optical deflector which has a deflection reflective surface, and deflects the light flux from the coupling lens at a uniform angular velocity;
an aperture which is provided on an optical path between said light source and said optical deflector and cuts a off peripheral portion of the light flux so as to control a beam spot diameter on a surface to be scanned; and
a scanning image-forming optical system converging the light flux deflected by said optical deflector to form a beam spot on said surface to be scanned so as to scan said surface to be scanned at a uniform velocity,
wherein:
the central wavelength of the light flux emitted by said light source is less than about 680 nm; and
NAO, $\kappa$, $\beta_0$ satisfy $$\beta_0/(NAO \cdot \kappa) < 100, \qquad (1)$$

and NAO satisfies $$0.18 < NAO < 0.35, \qquad (2)$$

where:
NAO represents the light-source-side numerical aperture of the coupling lens;
$\kappa$ represents the ratio A/D of the larger diameter A of the diameters, in a main scanning direction and a sub-scanning direction, of the opening of said aperture relative to the diameter D of the light flux emitted from the coupling lens; and
$\beta_0$ represents the larger one of the lateral magnifications, in the main scanning direction and the sub-scanning direction, of the entire optical system with respect to an optical path extending from said light source to said surface to be scanned, which optical path reaches a point of the image surface, at which point the image height is 0.

34. An image forming apparatus, comprising:
a light source which emits a light flux;
a coupling lens which couples the light flux emitted by said light source;
a optical deflector which has a deflection reflective surface, and deflects the light flux from the coupling lens at a uniform angular velocity;
an aperture which is provided on an optical path between said light source and said optical deflector and cuts off a peripheral portion of the light flux so as to control a beam spot diameter on a surface to be scanned; and
a scanning image-forming optical system converging the light flux deflected by said optical deflector to form a beam spot on said surface to be scanned so as to scan said surface to be scanned at a uniform velocity,
wherein:
the central wavelength of the light flux emitted by said light source is less than about 680 nm; and
NAO, $\kappa$, $\beta_0$ satisfy $$\beta_0/(NAO \cdot \kappa) < 100, \qquad (1)$$

and $\beta_0$ satisfies $$\beta_0 < 30 \qquad (3)$$

where:
NAO represents the light-source-side numerical aperture of the coupling lens;
$\kappa$ represents the ratio A/D of the larger diameter A of the diameters, in a main scanning direction and a sub-scanning direction, of the opening of said aperture, relative to the diameter D of the light flux emitted from the coupling lens; and
$\beta_0$ represents the larger one of the lateral magnifications, in the main scanning direction and the sub-scanning direction, of the entire optical system with respect to an optical path extending from said light source to said surface to be scanned, which optical path reaches a point of the image surface, at which point the image height is 0.

35. An image forming apparatus, comprising:
a light source which emits a light flux;
a coupling lens which couples the light flux emitted by said light source;
a optical deflector which has a deflection reflective surface, and deflects the light flux from the coupling lens at a uniform angular velocity;
an aperture which is provided on an optical path between said light source and said optical deflector and cuts off a peripheral portion of the light flux so as to control a beam spot diameter on a surface to be scanned; and
a scanning image-forming optical system converging the light flux deflected by said optical deflector to form a beam spot on said surface to be scanned so as to scan said surface to be scanned at a uniform velocity,
wherein:
the central wavelength of the light flux emitted by said light source is less than about 680 nm; and
NAO, $\kappa$, $\beta_0$ satisfy $$\beta_0/(NAO \cdot \kappa) < 100, \qquad (1)$$

and $\kappa$ satisfies $$0.2 < \kappa < 0.6, \qquad (4)$$

where:
NAO represents the light-source-side numerical aperture of the coupling lens;

κ represents the ratio A/D of the larger diameter A of the diameters, in a main scanning direction and a sub-scanning direction, of the opening of said aperture, relative to the diameter D of the light flux emitted from the coupling lens; and $\beta_0$ represents the larger one of the lateral magnifications, in the main scanning direction and the sub-scanning direction, of the entire optical system with respect to an optical path extending from said light source to said surface to be scanned, which optical path reaches a point of the image surface, at which point the image height is 0.

36. The image forming apparatus, as claimed in claim 33, wherein $\beta_0$ satisfies $$\beta_0 30. \quad (3)$$

37. The image forming apparatus, as claimed in claim 33, wherein κ satisfies $$0.2<\kappa<0.6. \quad (4)$$

38. The image forming apparatus, as claimed in claim 34, wherein κ satisfies $$0.2<\kappa<0.6. \quad (4)$$

39. The image forming apparatus, as claimed in claim 36, wherein κ satisfies $$0.2<\kappa<0.6. \quad (4)$$

40. The image forming apparatus, as claimed in claim 33, further comprising a line-image image-forming optical system having positive power only in the sub-scanning cross section on an optical path extending between said light source and said optical deflector, and wherein said aperture is placed on an optical path extending between said coupling lens and said line-image image-forming optical system.

41. The image forming apparatus, as claimed in claim 34, further comprising a line-image image-forming optical system having positive power only in the sub-scanning cross section on an optical path extending between said light source and said optical deflector, and wherein said aperture is placed on an optical path extending between said coupling lens and said line-image image-forming optical system.

42. The image forming apparatus, as claimed in claim 35, further comprising a line-image image-forming optical system having positive power only in the sub-scanning cross section on an optical path extending between said light source and said optical deflector, and wherein said aperture is placed on an optical path extending between said coupling lens and said line-image image-forming optical system.

43. The image forming apparatus as claimed in claim 33, wherein said coupling lens is arranged to couple the light flux emitted by said light source to form a parallel flux.

44. The image forming apparatus as claimed in claim 34, wherein said coupling lens is arranged to couple the light flux emitted by said light source to form a parallel flux.

45. The image forming apparatus as claimed in claim 35, wherein said coupling lens is arranged to couple the light flux emitted by said light source to form a parallel flux.

46. The image forming apparatus, as claimed in claim 33, wherein said scanning image-forming optical system comprises image-forming lenses.

47. The image forming apparatus as claimed in claim 34, wherein said scanning image-forming optical system comprises image-forming lenses.

48. The image forming apparatus as claimed in claim 35, wherein said scanning image-forming optical system comprises image-forming lenses.

49. An image forming apparatus, comprising:

light emitting means for emitting a light flux;

coupling means for coupling the light flux emitted by said light emitting means;

light deflecting means having a deflection reflective surface for deflecting the light flux from the coupling means at a uniform angular velocity;

light flux shaping means provided on an optical path between said light emitting means and said light deflecting means for cutting off a peripheral portion of the light flux so as to control a beam spot diameter on a surface to be scanned; and scanning image-forming optical means for converging the light flux deflected by said light deflecting means to form a beam spot on said surface to be scanned so as to scan said surface to be scanned at a uniform velocity, wherein:

the central wavelength of the light flux emitted by said light emitting means is less than about 680 nm; and NAO, κ, $\beta_0$ satisfy $$\beta hd\ 0/(NAO \cdot \kappa)<100, \quad (1)$$

and NAO satisfies $$0.18<NAO<0.35, \quad (2)$$

where:

NAO represents the light-emitting-means-side numerical aperture of said coupling means;

κ represents the ratio A/D of the larger one A of the diameters, in a main scanning direction and a sub-scanning direction, of the opening of said light flux shaping means, relative to the diameter D of the light flux emitted from said coupling means; and $\beta_0$ represents the larger one of the lateral magnifications, in the main scanning direction and the sub-scanning direction, of the entire optical system with respect to an optical path extending from said light emitting means to said surface to be scanned, which optical path reaches a point of the image surface, at which point the image height is 0.

50. An image forming apparatus, comprising:

light emitting means for emitting a light flux;

coupling means for coupling the light flux emitted by said light emitting means;

light deflecting means having a deflection reflective surface for deflecting the light flux from the coupling means at a uniform angular velocity;

light flux shaping means provided on an optical path between said light emitting means and said light deflecting means for cutting off a peripheral portion of the light flux so as to control a beam spot diameter on a surface to be scanned; and scanning image-forming optical means for converging the light flux deflected by said light deflecting means to form a beam spot on said surface to be scanned so as to scan said surface to be scanned at a uniform velocity, wherein:

the central wavelength of the light flux emitted by said light emitting means is less than about 680 nm; and NAO, κ, $\beta_0$ satisfy $$\beta_0/(NAO \cdot \kappa) < 100, \quad (1)$$

and NAO satisfies $$\beta_0 30 \quad (3)$$

where:
NAO represents the light-emitting-means-side numerical aperture of said coupling means;
κ represents the ratio A/D of the larger one A of the diameters, in a main scanning direction and a sub-scanning direction, of the opening of said light flux shaping means, relative to the diameter D of the light flux emitted from said coupling means; and
$\beta_0$ represents the larger one of the lateral magnifications, in the main scanning direction and the sub-scanning direction, of the entire optical system with respect to an optical path extending from said light emitting means to said surface to be scanned, which optical path reaches a point of the image surface, at which point the image height is 0.

51. An image forming apparatus, comprising:
light emitting means for emitting a light flux;
coupling means for coupling the light flux emitted by said light emitting means;
light deflecting means having a deflection reflective surface for deflecting the light flux from the coupling means at a uniform angular velocity;
light flux shaping means provided on an optical path between said light emitting means and said light deflecting means for cutting off a peripheral portion of the light flux so as to control a beam spot diameter on a surface to be scanned; and
scanning image-forming optical means for converging the light flux deflected by said light deflecting means to form a beam spot on said surface to be scanned so as to scan said surface to be scanned at a uniform velocity, wherein:
the central wavelength of the light flux emitted by said light emitting means is less than about 680 nm; and
NAO, κ, $\beta_0$ satisfy $$\beta_0/(NAO \cdot \kappa) < 100, \quad (1)$$

and NAO satisfies $$0.2 < \kappa < 0.6 \quad (4)$$

where:
NAO represents the light-emitting-means-side numerical aperture of said coupling means;
κ represents the ratio A/D of the larger one A of the diameters, in a main scanning direction and a sub-scanning direction, of the opening of said light flux shaping means, relative to the diameter D of the light flux emitted from said coupling means; and
$\beta_0$ represents the larger one of the lateral magnifications, in the main scanning direction and the sub-scanning direction, of the entire optical system with respect to an optical path extending from said light emitting means to said surface to be scanned, which optical path reaches a point of the image surface, at which point the image height is 0.

52. The image forming apparatus, as claimed in claim 49, wherein satisfies $$\beta_0 < 30. \quad (3)$$

53. The image forming apparatus, as claimed in claim 49, wherein κ satisfies $$0.2 < \kappa < 0.6. \quad (4)$$

54. The image forming apparatus, as claimed in claim 50, wherein κ satisfies $$0.2 < \kappa < 0.6. \quad (4)$$

55. The image forming apparatus, as claimed in claim 52, wherein κ satisfies $$0.2 < \kappa < 0.6. \quad (4)$$

56. The image forming apparatus, as claimed in claim 49, further comprising line-image image-forming optical means having positive power only in the sub-scanning cross section on an optical path extending between said light emitting means and said light deflecting means, wherein said light flux shaping means is placed on an optical path extending between said coupling means and said line-image image-forming optical means.

57. The image forming apparatus, as claimed in claim 50, further comprising line-image image-forming optical means having positive power only in the sub-scanning cross section on an optical path extending between said light emitting means and said light deflecting means, wherein said light flux shaping means is placed on an optical path extending between said coupling means and said line-image image-forming optical means.

58. The image forming apparatus, as claimed in claim 51, further comprising line-image image-forming optical means having positive power only in the sub-scanning cross section on an optical path extending between said light emitting means and said light deflecting means, wherein said light flux shaping means is placed on an optical path extending between said coupling means and said line-image image-forming optical means.

59. The image forming apparatus as claimed in claim 49, wherein said coupling means couples the light flux emitted by said light emitting means to form a parallel flux.

60. The image forming apparatus as claimed in claim 50, wherein said coupling means couples the light flux emitted by said light emitting means to form a parallel flux.

61. The image forming apparatus as claimed in claim 51, wherein said coupling means couples the light flux emitted by said light emitting means to form a parallel flux.

62. The image forming apparatus as claimed in claim 49, wherein said scanning image-forming optical means comprises image-forming lenses.

63. The image forming apparatus as claimed in claim 50, wherein said scanning image-forming optical means comprises image-forming lenses.

64. The image forming apparatus as claimed in claim 51, wherein said scanning image-forming optical means comprises image-forming lenses.

65. An optical scanning method, comprising the steps of:
a) coupling a light flux emitted by a light source, using a coupling lens;
b) cutting off a peripheral portion of the light flux emitted from said coupling lens so as to control a beam spot diameter on a surface to be scanned, using an aperture;
c) deflecting the light flux emitted from said aperture-at a uniform angular velocity, using an optical deflector having a deflection reflective surface;

d) converging the light flux deflected by said optical deflector to form a beam spot on said surface to be scanned so as to scan said surface to be scanned at a uniform velocity, using a scanning image-forming optical system, wherein:

the central wavelength of the light flux emitted by said light source is less than about 680 nm; and NAO, κ, $\beta_0$ satisfy $$\beta_0/(NAO \cdot \kappa) < 100, \quad (1)$$

and NAO satisfies $$0.18 < NAO < 0.35, \quad (2)$$

where:

NAO represents the light-source-side numerical aperture of said coupling lens;

κ represents the ratio A/D of the larger one A of the diameters, in a main scanning direction and a sub-scanning direction, of the opening of said aperture, relative to the diameter D of the light flux emitted from said coupling lens; and $\beta_0$ represents the larger one of the lateral magnifications, in the main scanning direction and the sub-scanning direction, of the entire optical system with respect to an optical path extending from said light source to said surface to be scanned, which optical path reaches a point of the image surface, at which point the image height is 0.

66. An optical scanning method, comprising the steps of:

a) coupling a light flux emitted by a light source, using a coupling lens;

b) cutting off a peripheral portion of the light flux emitted from said coupling lens so as to control a beam spot diameter on a surface to be scanned, using an aperture;

c) deflecting the light flux emitted from said aperture at a uniform angular velocity, using a optical deflector having a deflection reflective surface;

d) converging the light flux deflected by said optical deflector to form a beam spot on said surface to be scanned so as to scan said surface to be scanned at a uniform velocity, using a scanning image-forming optical system, wherein:

the central wavelength of the light flux emitted by said light source is less than about 680 nm; and NAO, κ, $\beta_0$ satisfy $$\beta_0/(NAO \cdot \kappa) < 100, \quad (1)$$

and $\beta_0$ satisfies $$\beta_0 < 30, \quad (3)$$

where:

NAO represents the light-source-side numerical aperture of said coupling lens;

κ represents the ratio A/D of the larger one A of the diameters, in a main scanning direction and a sub-scanning direction, of the opening of said aperture, relative to the diameter D of the light flux emitted from said coupling lens; and $\beta_0$ represents the larger one of the lateral magnifications, in the main scanning direction and the sub-scanning direction, of the entire optical system with respect to an optical path extending from said light source to said surface to be scanned, which optical path reaches a point of the image surface, at which point the image height is 0.

67. An optical scanning method, comprising the steps of:

a) coupling a light flux emitted by a light source, using a coupling lens;

b) cutting off a peripheral portion of the light flux emitted from said coupling lens so as to control a beam spot diameter on a surface to be scanned, using an aperture;

c) deflecting the light flux emitted from said aperture at a uniform angular velocity, using a optical deflector having a deflection reflective surface;

d) converging the light flux deflected by said optical deflector in said step c) to form a beam spot on said surface to be scanned so as to scan said surface to be scanned at a uniform velocity, using a scanning image-forming optical system, wherein:

the central wavelength of the light flux emitted by said light source is less than about 680 nm; and NAO, κ, $\beta_0$ satisfy $$\beta_0/(NAO \cdot \kappa) < 100, \quad (1)$$

and κ satisfies $$0.2 < \kappa < 0.6, \quad (4)$$

where:

NAO represents the light-source-side numerical aperture of said coupling lens;

κ represents the ratio A/D of the larger one A of the diameters, in a main scanning direction and a sub-scanning direction, of the opening of said aperture, relative to the diameter D of the light flux emitted-from said coupling lens; and $\beta_0$ represents the larger one of the lateral magnifications, in the main scanning direction and the sub-scanning direction, of the entire optical system with respect to an optical path extending from said light source to said surface to be scanned, which optical path reaches a point of the image surface, at which point the image height is 0.

68. The optical scanning method, as claimed in claim 65, wherein $\beta_0$ satisfies $$\beta_0 30. \quad (3)$$

69. The optical scanning method, as claimed in claim 65, wherein κ satisfies $$0.2 < \kappa < 0.6. \quad (4)$$

70. The optical scanning method as claimed in claim 66, wherein κ satisfies $$0.2 < \kappa < 0.6. \quad (4)$$

71. The optical scanning method, as claimed in claim 68, wherein κ satisfies $$0.2 < \kappa < 0.6. \quad (4)$$

72. The optical scanning method, as claimed in claim 65, further comprising the step of forming a line image before said step c), using a line-image image-forming optical system having positive power only in the sub-scanning cross section, wherein said aperture is placed on an optical path extending between said coupling lens and said line-image image-forming optical system.

73. The optical scanning method, as claimed in claim 66, further comprising the step of forming a line image before said step c), using a line-image image-forming optical system having positive power only in the sub-scanning cross section, wherein said aperture is placed on an optical path extending between said coupling lens and said line-image image-forming optical system.

74. The optical scanning method, as claimed in claim 67, further comprising the step of forming a line image before said step c), using a line-image image-forming optical system having positive power only in the sub-scanning cross section, wherein said aperture is placed on an optical path extending between said coupling lens and said line-image image-forming optical system.

75. The optical scanning method, as claimed in claim 65, wherein said step a) couples the light flux emitted by said light source to form a parallel flux.

76. The optical scanning method, as claimed in claim 66, wherein said step a) couples the light flux emitted by said light source to form a parallel flux.

77. The optical scanning method, as claimed in claim 67, wherein said step a) couples the light flux emitted by said light source to form a parallel flux.

78. The optical scanning method, as claimed in claim 65, wherein said scanning image-forming optical system comprises image-forming lenses.

79. The optical scanning method, as claimed in claim 66, wherein said scanning image-forming optical system comprises image-forming lenses.

80. The optical scanning method, as claimed in claim 67, wherein said scanning image-forming optical system comprises image-forming lenses.

* * * * *